United States Patent
Kim et al.

(10) Patent No.: US 11,321,867 B2
(45) Date of Patent: May 3, 2022

(54) METHOD AND SYSTEM FOR CALCULATING SPATIAL COORDINATES OF REGION OF INTEREST, AND NON-TRANSITORY COMPUTER-READABLE RECORDING MEDIUM

(71) Applicant: VTOUCH CO., LTD., Seoul (KR)

(72) Inventors: Seok Joong Kim, Seoul (KR); Jik Han Jung, Yongin-si (KR)

(73) Assignee: VTOUCH CO., LTD., Seoul (KR)

( * ) Notice: Subject to any disclaimer, the term of this patent is extended or adjusted under 35 U.S.C. 154(b) by 0 days.

(21) Appl. No.: 17/097,300

(22) Filed: Nov. 13, 2020

(65) Prior Publication Data

US 2021/0065397 A1    Mar. 4, 2021

Related U.S. Application Data

(63) Continuation of application No. PCT/KR2018/010711, filed on Sep. 12, 2018.

(30) Foreign Application Priority Data

May 16, 2018 (KR) .......................... 10-2018-0056039

(51) Int. Cl.
G06T 7/70 (2017.01)
G06V 10/25 (2022.01)

(52) U.S. Cl.
CPC ................ *G06T 7/70* (2017.01); *G06V 10/25* (2022.01)

(58) Field of Classification Search
CPC ................................. G06T 7/70; G06K 9/3233
USPC ....................................................... 382/103
See application file for complete search history.

(56) References Cited

U.S. PATENT DOCUMENTS

2019/0163284 A1*  5/2019  Kim ........................ G06V 40/28

FOREIGN PATENT DOCUMENTS

| KR | 1020080021181 A | 3/2008 | |
|---|---|---|---|
| KR | 1020090000186 A | 1/2009 | |
| KR | 1020120040924 A | 4/2012 | |
| KR | 2014012771 A * | 2/2014 | ............. A61B 34/30 |
| KR | 1020140012771 A | 2/2014 | |

(Continued)

OTHER PUBLICATIONS

International Search Report of PCT/KR2018/010711 dated Mar. 4, 2019.

*Primary Examiner* — Wednel Cadeau
(74) *Attorney, Agent, or Firm* — Dinsmore & Shohl LLP; Yongsok Choi, Esq.

(57) ABSTRACT

A method includes acquiring information on an in-image coordinate point of a region of interest contained in each of a plurality of images respectively photographed by a plurality of image modules; specifying, with reference to information on a position where at least one of the plurality of image modules is installed and information on an in-image coordinate point of a target region of interest contained in an image photographed by the at least one image module, a candidate figure containing a position where the target region of interest is located in a reference space; and specifying the position where the target region of interest is located in the reference space, with reference to a positional relationship between a first candidate figure of the target region of interest corresponding to a first image module and a second candidate figure of the target region of interest corresponding to a second image module.

14 Claims, 12 Drawing Sheets

(56) References Cited

FOREIGN PATENT DOCUMENTS

KR     1020160120895 A     10/2016
KR     1020180016889 A     2/2018

* cited by examiner

METHOD AND SYSTEM FOR CALCULATING SPATIAL COORDINATES OF REGION OF INTEREST, AND NON-TRANSITORY COMPUTER-READABLE RECORDING MEDIUM

CROSS-REFERENCE TO RELATED APPLICATION(S)

This application is a continuation application of Patent Cooperation Treaty (PCT) International Application No. PCT/KR2018/010711 filed on Sep. 12, 2018, which claims priority to Korean Patent Application No. 10-2018-0056039 filed on May 16, 2018. The entire contents of PCT International Application No. PCT/KR2018/010711 and Korean Patent Application No. 10-2018-0056039 are hereby incorporated by reference.

FIELD OF THE INVENTION

The present invention relates to a method, system, and non-transitory computer-readable recording medium for calculating a spatial coordinate point of a region of interest.

BACKGROUND

In recent years, as interest in augmented reality (AR) or virtual reality (VR) is increasing and research and development in related technical fields are actively carried out, a variety of techniques for acquiring a spatial coordinate point of an object have been introduced.

As one example of conventional techniques, a three-dimensional coordinate measurement device for measuring three-dimensional coordinate points of a user's body using a time-of-flight (TOF) technique has been introduced.

However, according to the techniques introduced so far as well as the above-described conventional technique, there is a problem that excessive resources and plenty of time are required in acquiring a spatial coordinate point of an object, because (1) when a single three-dimensional camera is used, there may be an area obscured by the camera depending on a position or direction of the object, and (2) when two or more three-dimensional cameras are used, a spatial coordinate point of a desired region can be calculated only after receiving not only a coordinate point of the desired region but also all images containing the desired region and its surrounding regions (or entire coordinate points corresponding thereto) from each of the cameras, and then integrating the received images to calculate spatial coordinate points of all the regions.

In this connection, the inventor(s) present a technique capable of receiving information on in-image coordinate points of a region of interest contained in images photographed by a plurality of image modules, and selectively calculating only a spatial coordinate point of the region of interest using the received information.

SUMMARY OF THE INVENTION

One object of the present invention is to solve all the above-described problems in the prior art.

Another object of the invention is to calculate a coordinate point of a region of interest in a reference space by not acquiring images photographed by a plurality of image modules but acquiring only information on in-image coordinate points of the region of interest contained in the images.

Yet another object of the invention is to prevent privacy invasion problems due to hacking or the like by not acquiring images photographed by a plurality of image modules but selectively collecting only information on in-image coordinate points of the region of interest contained in the images.

Still another object of the present invention is to calculate a coordinate point of a region of interest in a reference space using less resources.

The representative configurations of the invention to achieve the above objects are described below.

According to one aspect of the invention, there is provided a method for calculating a spatial coordinate point of a region of interest, the method comprising the steps of: acquiring information on an in-image coordinate point of a region of interest contained in each of a plurality of images respectively photographed by a plurality of image modules; specifying, with reference to information on a position where at least one of the plurality of image modules is installed and information on an in-image coordinate point of a target region of interest contained in an image photographed by the at least one image module, a candidate figure containing a position where the target region of interest is located in a reference space; and specifying the position where the target region of interest is located in the reference space, with reference to a positional relationship between a first candidate figure of the target region of interest corresponding to a first image module and a second candidate figure of the target region of interest corresponding to a second image module.

According to another aspect of the invention, there is provided a system for calculating a spatial coordinate point of a region of interest, the system comprising: an information acquisition unit configured to acquire information on an in-image coordinate point of a region of interest contained in each of a plurality of images respectively photographed by a plurality of image modules; and a spatial coordinate calculation unit configured to specify, with reference to information on a position where at least one of the plurality of image modules is installed and information on an in-image coordinate point of a target region of interest contained in an image photographed by the at least one image module, a candidate figure containing a position where the target region of interest is located in a reference space, and to specify the position where the target region of interest is located in the reference space, with reference to a positional relationship between a first candidate figure of the target region of interest corresponding to a first image module and a second candidate figure of the target region of interest corresponding to a second image module.

In addition, there are further provided other methods and systems to implement the invention, as well as non-transitory computer-readable recording media having stored thereon computer programs for executing the methods.

According to the invention, it is possible to calculate a coordinate point of a region of interest in a reference space by not acquiring images photographed by a plurality of image modules but acquiring only information on in-image coordinate points of the region of interest contained in the images.

According to the invention, it is possible to prevent privacy invasion problems due to hacking or the like by not acquiring images photographed by a plurality of image modules but selectively collecting only information on in-image coordinate points of the region of interest contained in the images.

According to the invention, it is possible to calculate a coordinate point of a region of interest in a reference space using less resources.

DETAILED DESCRIPTION

Figure 1:
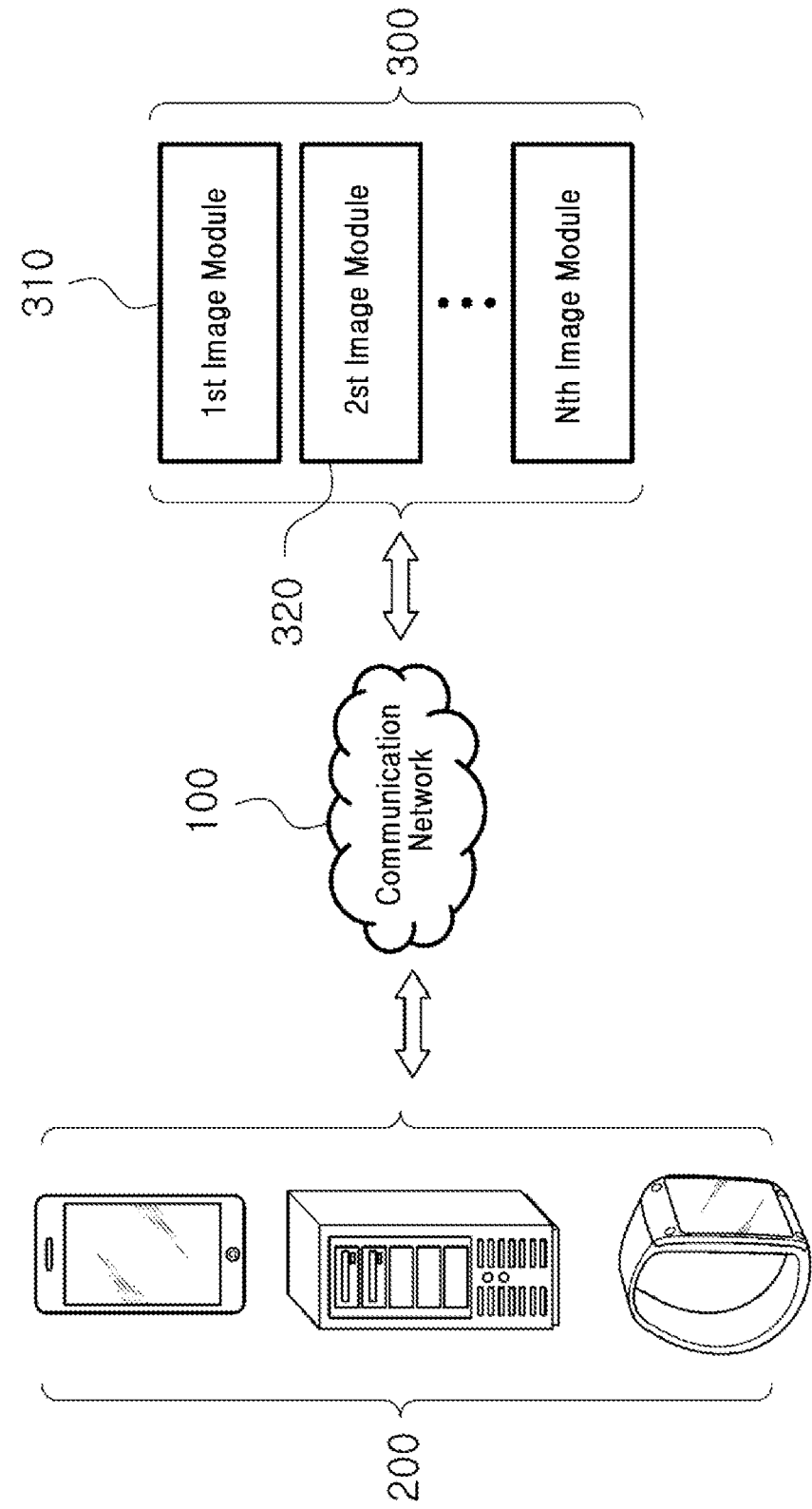
FIG. 1 illustratively shows the configuration of an entire system for calculating a spatial coordinate point of a region of interest according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 illustratively shows the configuration of the entire system for calculating a spatial coordinate point of a region of interest according to one embodiment of the invention.

As shown in FIG. 1, the entire system according to one embodiment of the invention may comprise a communication network 100, a position calculation system 200, and a plurality of image modules 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the position calculation system 200 according to one embodiment of the invention may be a digital device having a memory means and a microprocessor for computing capabilities. The position calculation system 200 may be a server system.

According to one embodiment of the invention, the position calculation system 200 may function to: acquire information on an in-image coordinate point of a region of interest contained in each of a plurality of images respectively photographed by the plurality of image modules 300 to be described below; specify, with reference to information on a position where at least one of the plurality of image modules 300 is installed and information on an in-image coordinate point of a target region of interest contained in an image photographed by the at least one image module, a candidate figure containing a position where the target region of interest is located in a reference space; and specify the position where the target region of interest is located in the reference space, with reference to a positional relationship between a first candidate figure of the target region of interest corresponding to a first image module 310 and a second candidate figure of the target region of interest corresponding to a second image module 320.

The reference space according to one embodiment of the invention may encompass a space defined in a coordinate system with respect to which the position calculation system 200 according to the invention calculate a spatial coordinate point of a region of interest.

The configuration and functions of the position calculation system 200 according to the invention will be discussed in more detail below. Meanwhile, although the position calculation system 200 has been described as above, the above description is illustrative, and it will be apparent to those skilled in the art that at least a part of the functions or components required for the position calculation system 200 may be implemented or included in an external system (not shown), as necessary.

Next, the plurality of image modules 300 according to one embodiment of the invention may be connected to the position calculation system 200 via the communication network 100, and may function to specify at least one region of interest contained in a plurality of images respectively photographed by the plurality of image modules 300, and extract information on in-image coordinate points of the specified region of interest.

For example, the plurality of image modules 300 according to one embodiment of the invention may include camera modules (e.g., two-dimensional, three-dimensional, or the like), image or video sensors, and the like.

Configuration of the Position Calculation System

Hereinafter, the internal configuration of the position calculation system 200 crucial for implementing the invention and the functions of the respective components thereof will be discussed.

Figure 2:
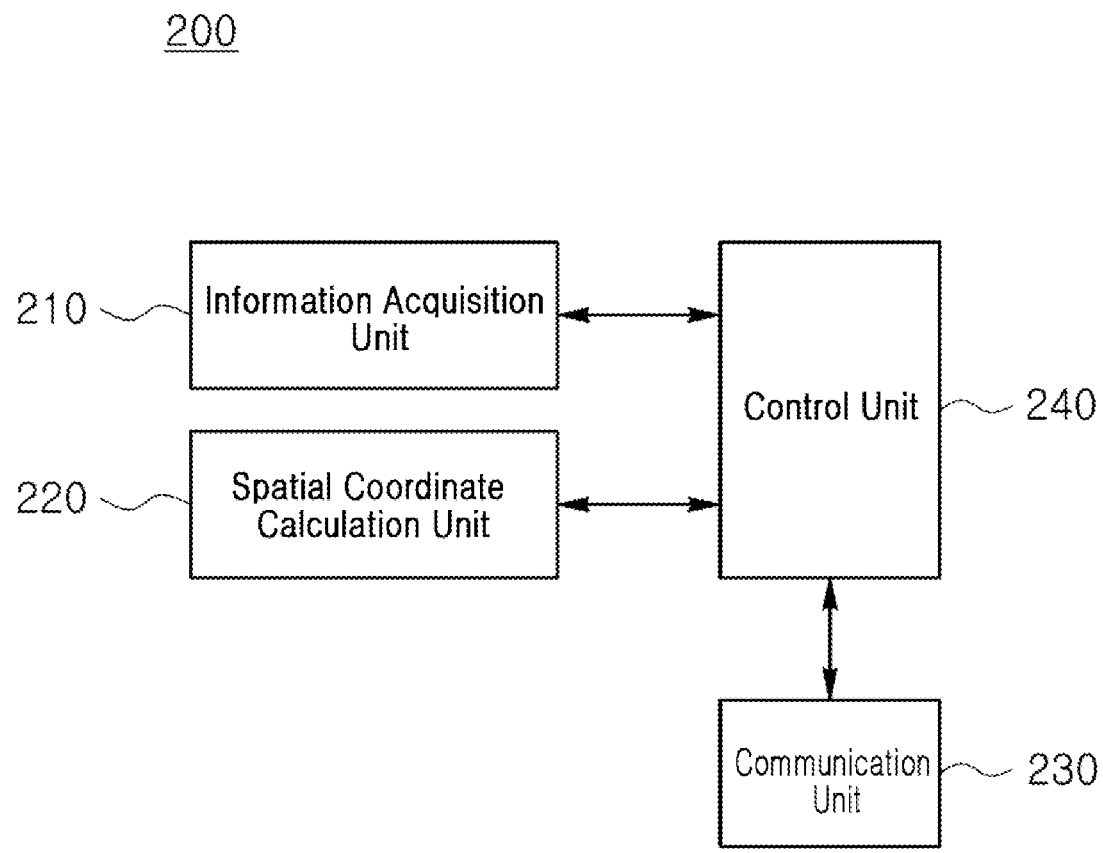
FIG. 2 specifically shows the internal configuration of a position calculation system according to one embodiment of the invention.

FIG. 2 specifically shows the internal configuration of the position calculation system 200 according to one embodiment of the invention.

As shown in FIG. 2, the position calculation system 200 according to one embodiment of the invention may comprise an information acquisition unit 210, a spatial coordinate calculation unit 220, a communication unit 230, and a control unit 240. According to one embodiment of the invention, at least some of the information acquisition unit 210, the spatial coordinate calculation unit 220, the communication unit 230, and the control unit 240 may be program modules to communicate with an external system. The program modules may be included in the position calculation system 200 in the form of operating systems, application program modules, and other program modules, while they may be physically stored in a variety of commonly known storage devices. Further, the program modules may also be stored in a remote storage device that may communicate with the position calculation system 200. Meanwhile, such program modules may include, but not limited to, routines, subroutines, programs, objects, components, data structures, and the like for performing specific tasks or executing specific abstract data types as will be described below in accordance with the invention.

First, the information acquisition unit 210 according to one embodiment of the invention may function to acquire information on an in-image coordinate point of a region of interest contained in each of a plurality of images respectively photographed by the plurality of image modules 300.

Specifically, the plurality of image modules 300 according to one embodiment of the invention may specify an image corresponding to the region of interest among the plurality of images, and extract information on an in-image coordinate point of the specified region of interest. The information acquisition unit 210 may acquire the extracted information on the in-image coordinate point of the region of interest from each of the plurality of image modules 300.

For example, according to one embodiment of the invention, among a plurality of images of a user's body respectively photographed by a plurality of cameras 300, an image of a predetermined body part (e.g., a hand, a fingertip, an eye, or the like) of the user may be specified as an image of a region of interest. Further, according to one embodiment of the invention, each of the plurality of cameras 300 may extract information on a two- or three-dimensional in-image coordinate point of the specified region of interest, and the information acquisition unit 210 may acquire the extracted information on the two- or three-dimensional coordinate point from each of the plurality of cameras 300. According to one embodiment of the invention, the information on the two- or three-dimensional in-image coordinate point of the region of interest may be acquired from information on in-image pixels or voxels of the region of interest.

Next, the spatial coordinate calculation unit 220 according to one embodiment of the invention may function to specify, with reference to information on a position where at least one of the plurality of image modules 300 is installed and information on an in-image coordinate point of a target region of interest contained in an image photographed by the at least one image module, a candidate figure containing a position where the target region of interest is located in a reference space. The target region of interest according to one embodiment of the invention may refer to at least one of a plurality of regions of interest specified by each of the plurality of image modules 300, or may encompass a region of interest specified by at least some of the plurality of image modules 300 among a plurality of regions of interest specified by the plurality of image modules 300. Further, the candidate figure according to one embodiment of the invention may refer to a point, a line (which may include a vector), a surface, a body, or a set thereof.

Specifically, the spatial coordinate calculation unit 220 according to one embodiment of the invention may specify a candidate figure containing a position where the target region of interest is located in the reference space, with respect to a position where the at least one image module is installed in the reference space.

More specifically, when a first image module 310 and a second image module 320 of the plurality of image modules 300 are two-dimensional image modules, the spatial coordinate calculation unit 220 according to one embodiment of the invention may specify a candidate figure corresponding to each of the first image module 310 and the second image module 320, which contains a position where the target region of interest is located in the reference space, as a vector. In this case, according to one embodiment of the invention, the vector may be established such that an initial (or terminal) point thereof is located at a coordinate point of a position where the corresponding image module is installed in the reference space, and a terminal (or initial) point thereof is located at a coordinate point in the reference space that is transformed from an in-image coordinate point of the target region of interest corresponding to the image module, with respect to the coordinate point of the position where the image module is installed in the reference space. Further, when the first image module 310 and the second image module 320 of the plurality of image modules 300 are three-dimensional image modules, the spatial coordinate calculation unit 220 according to one embodiment of the invention may specify a candidate figure corresponding to each of the first image module 310 and the second image module 320, which contains a position where the target region of interest is located in the reference space, as a spatial figure (e.g., a cube, a rectangular parallelepiped, a sphere, or the like). Furthermore, when the first image module 310 and the second image module 320 of the plurality of image modules 300 are a three-dimensional image module and a two-dimensional image module, respectively, the spatial coordinate calculation unit 220 according to one embodiment of the invention may specify candidate figures corresponding to the first image module 310 and the second image module 320, which contain a position where the target region of interest is located in the reference space, as a spatial figure and a vector, respectively.

Further, the spatial coordinate calculation unit 220 according to one embodiment of the invention may specify the candidate figure with further reference to information on properties of at least one of the plurality of image modules 300. According to one embodiment of the invention, the information on the properties of the at least one image module may include information on a resolution, an angle of view, a focal length, support for three-dimensions, and the like of the image module.

For example, the spatial coordinate calculation unit 220 according to one embodiment of the invention may refer to information on an angle of view, a focal length, and the like of at least one of the plurality of image modules 300 to determine information on at least one of a transformation angle (e.g., a rotation angle), a transformation position, and a transformation shape (e.g., a spatial figure when the image module 300 is a three-dimensional image module, or a vector when the image module 300 is a two-dimensional image module) for transforming an in-image coordinate point of a target region of interest corresponding to the at least one image module to a coordinate point in the reference space, with respect to a coordinate point of a position where the at least one image module is installed in the reference space, thereby specifying a position where the target region of interest corresponding to the at least one image module is located in the reference space and a candidate figure containing the position.

Meanwhile, when some of the plurality of image modules 300 (e.g., a third image module) are determined to have difficulty in acquiring information on an in-image coordinate point of a target region of interest (e.g., when the region of interest is obscured by the user and is not visible), the spatial coordinate calculation unit 220 according to one embodiment of the invention may refer to information on positions where image modules other than the third image module among the plurality of image modules 300 are installed, and information on in-image coordinate points of the target region of interest contained in images photographed by the image modules other than the third image module among the plurality of image modules 300.

Further, the spatial coordinate calculation unit 220 according to one embodiment of the invention may function to specify the position where the target region of interest is located in the reference space, with reference to a positional relationship between a first candidate figure of the target region of interest corresponding to the first image module 310 and a second candidate figure of the target region of interest corresponding to the second image module 320.

For example, according to one embodiment of the invention, the candidate figures of the first image module 310 and the second image module 320 may be specified as vectors when the first image module 310 and the second image module 320 are two-dimensional image modules, and the spatial coordinate calculation unit 220 may specify a point of intersection between a first vector of the target region of interest corresponding to the first image module 310 and a second vector of the target region of interest corresponding to the second image module 320 as the position where the target region of interest is located in the reference space. Meanwhile, according to one embodiment of the invention, when the first and second vectors do not intersect, a midpoint of the shortest line connecting the first and second vectors may be specified as the position where the target region of interest is located in the reference space.

As another example, according to one embodiment of the invention, the candidate figures of the first image module 310 and the second image module 320 may be specified as spatial figures when the first image module 310 and the second image module 320 are three-dimensional image modules, and the spatial coordinate calculation unit 220 may specify a region of intersection between a first spatial figure of the target region of interest corresponding to the first image module 310 and a second spatial figure of the target region of interest corresponding to the second image module 320 as the position where the target region of interest is located in the reference space. More specifically, according to one embodiment of the invention, when the first and second spatial figures completely intersect (i.e., overlap) each other, an average coordinate point of the first or second spatial figure may be specified as the position where the target region of interest is located in the reference space. When the first and second spatial figures only partially intersect each other, a midpoint of a line connecting average coordinate points of the first and second spatial figures may be specified as the position where the target region of interest is located in the reference space.

Figure 3:
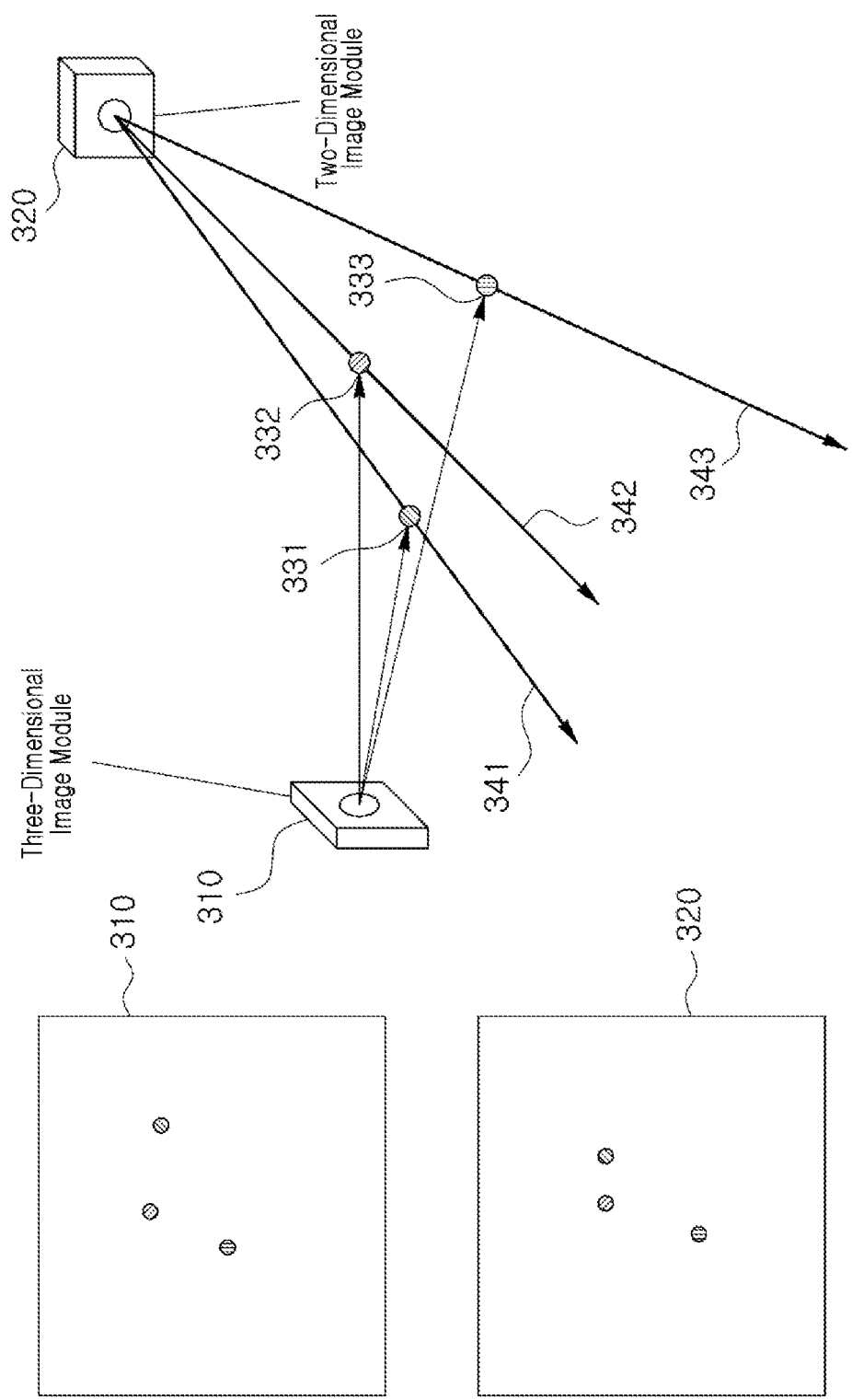
FIG. 3 illustratively shows how to specify a position where a target region of interest is located in a reference space according to one embodiment of the invention.

As yet another example, referring to FIG. 3, according to one embodiment of the invention, the candidate figures of the first image module 310 and the second image module 320 may be specified as a spatial figure and a vector, respectively, when the first image module 310 and the second image module 320 are a three-dimensional image module and a two-dimensional image module, respectively, and the spatial coordinate calculation unit 220 may specify a point of intersection between a third spatial figure or object 331, 332, 333 of the target region of interest corresponding to the first image module 310 and a third vector 341, 342, 343 of the target region of interest corresponding to the second image module 320 as the position where the target region of interest is located in the reference space. More specifically, according to one embodiment of the invention, a midpoint of the shortest line connecting the third vector 341 and an average coordinate point of the third spatial figure or object 331 may be specified as the position where the target region of interest is located in the reference space.

Meanwhile, the spatial coordinate calculation unit 220 according to one embodiment of the invention may specify a point where the target region of interest is located in the reference space, with further reference to resolution information among the information on the properties of the image modules.

Specifically, the spatial coordinate calculation unit 220 according to one embodiment of the invention may adaptively determine an area or volume of a candidate figure indicating the position where the target region of interest is located in the reference space, according to resolutions of the image modules.

Figure 4:
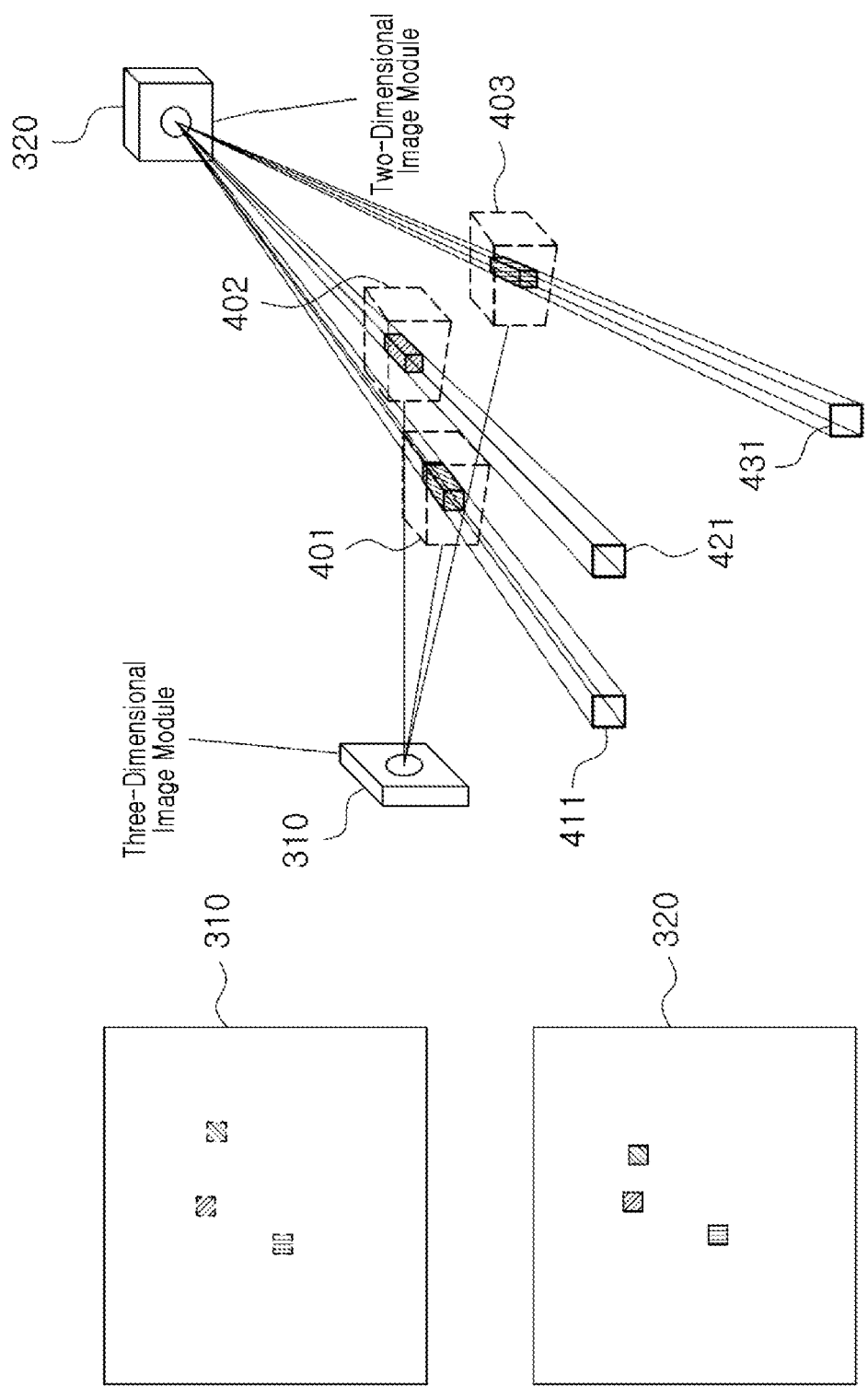
FIG. 4 illustratively shows how to specify a position where a target region of interest is located in a reference space in consideration of resolutions of image modules according to one embodiment of the invention.

For example, referring to FIG. 4, the spatial coordinate calculation unit 220 according to one embodiment of the invention may refer to information on a resolution of the first image module 310 (which is a three-dimensional image module) to establish a first cube 401, a second cube 402, and a third cube 403 in the reference space, respectively, in correspondence to in-image coordinate points of a plurality of target regions of interest of the first image module 310, and may determine volumes of the above cubes (i.e., the first cube 401, the second cube 402, and the third cube 403) to be larger as the resolution of the first image module 310 is lower.

As another example, the spatial coordinate calculation unit 220 according to one embodiment of the invention may refer to information on a resolution of the second image module 320 (which is a two-dimensional image module) to establish a first tetragon 411, a second tetragon 421, and a third tetragon 431 in the reference space, respectively, in correspondence to in-image coordinate points of a plurality of target regions of interest of the second image module 320, and may determine areas of the above tetragons to be larger as the resolution of the second image module 320 is lower. Further, in this case, according to one embodiment of the invention, the spatial coordinate calculation unit 220 may specify the position where the target region of interest is located in the reference space, using a quadrangular pyramid (i.e., a first quadrangular pyramid, a second quadrangular pyramid, and a third quadrangular pyramid) connecting a position where the second image module 320 is installed in the reference space and a tetragon in the reference space corresponding to in-image coordinate points of the target region of interest, instead of the above-described vectors of the target region of interest corresponding to the second image module 320.

Meanwhile, the shape of a surface that may be established in the reference space in correspondence to in-image coordinate points of the target region of interest according to the invention is not limited to a tetragon as described above, but may be changed to a circle, a triangle, a pentagon, and the like as long as the objects of the invention may be achieved. The shape of a solid that that may be established in the reference space in correspondence to in-image coordinate points of the target region of interest according to the invention is not limited to a cube as described above, but may be changed to a rectangular parallelepiped, a sphere, an ellipsoid, and the like.

Further, the spatial coordinate calculation unit 220 according to one embodiment of the invention may specify a candidate figure whose positional relationship is to be matched with a first candidate figure of the first image module 310 (or the second image module 320) among at least one candidate figure of the second image module 320 (or the first image module 310).

Figure 5:
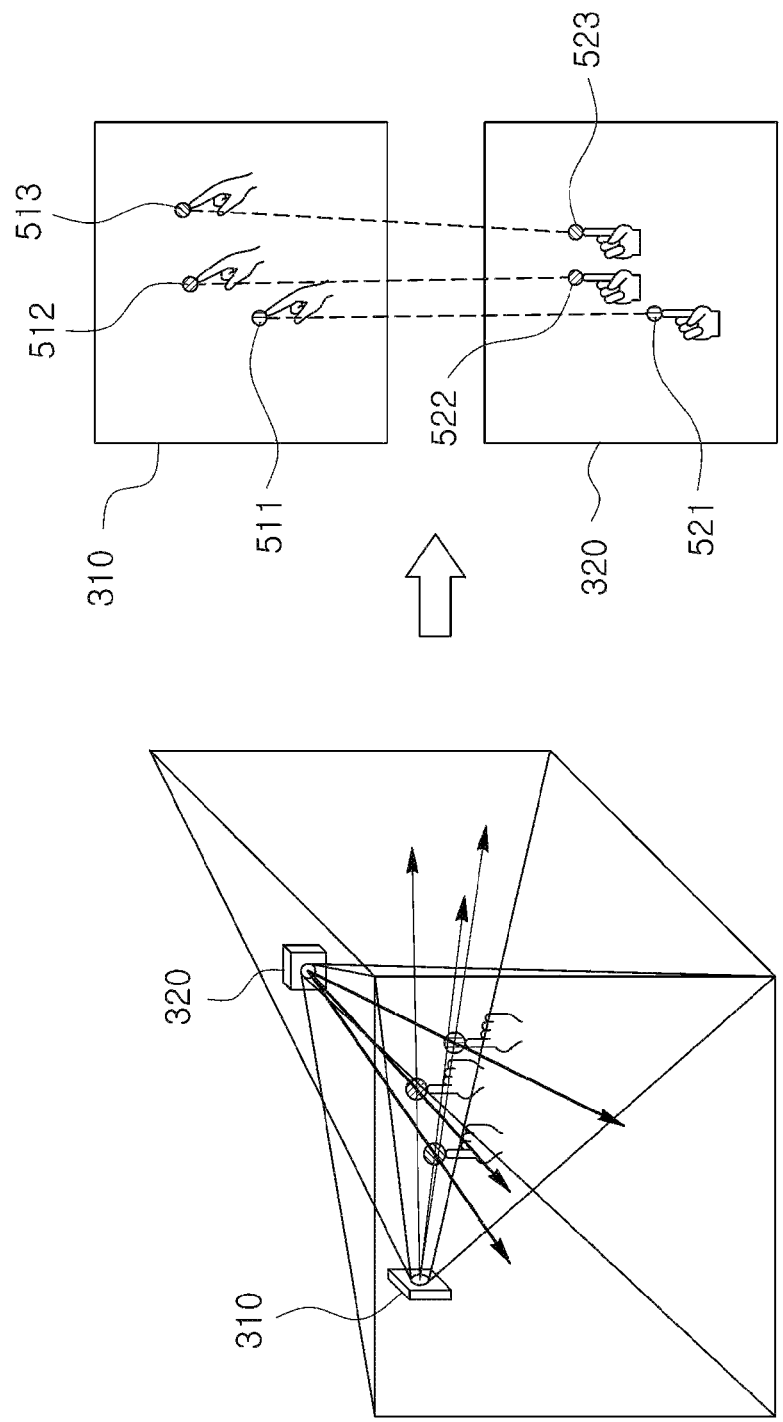
FIG. 5 illustratively shows how to specify a matching relationship between candidate figures according to one embodiment of the invention.

For example, referring to FIG. 5, at least one of the plurality of image modules 300 according to one embodiment of the invention may be synchronized with each other on a frame basis, and the spatial coordinate calculation unit 220 may specify a candidate figure or object 521 whose positional relationship is to be matched with a first candidate figure or object 511 of the first image module 310 (or the second image module 320) among at least one candidate figure or object 521, 522, 523 of the second image module 320 (or the first image module 310) on the basis of each frame synchronized between the first image module 310 and the second image module 320.

Figure 6:
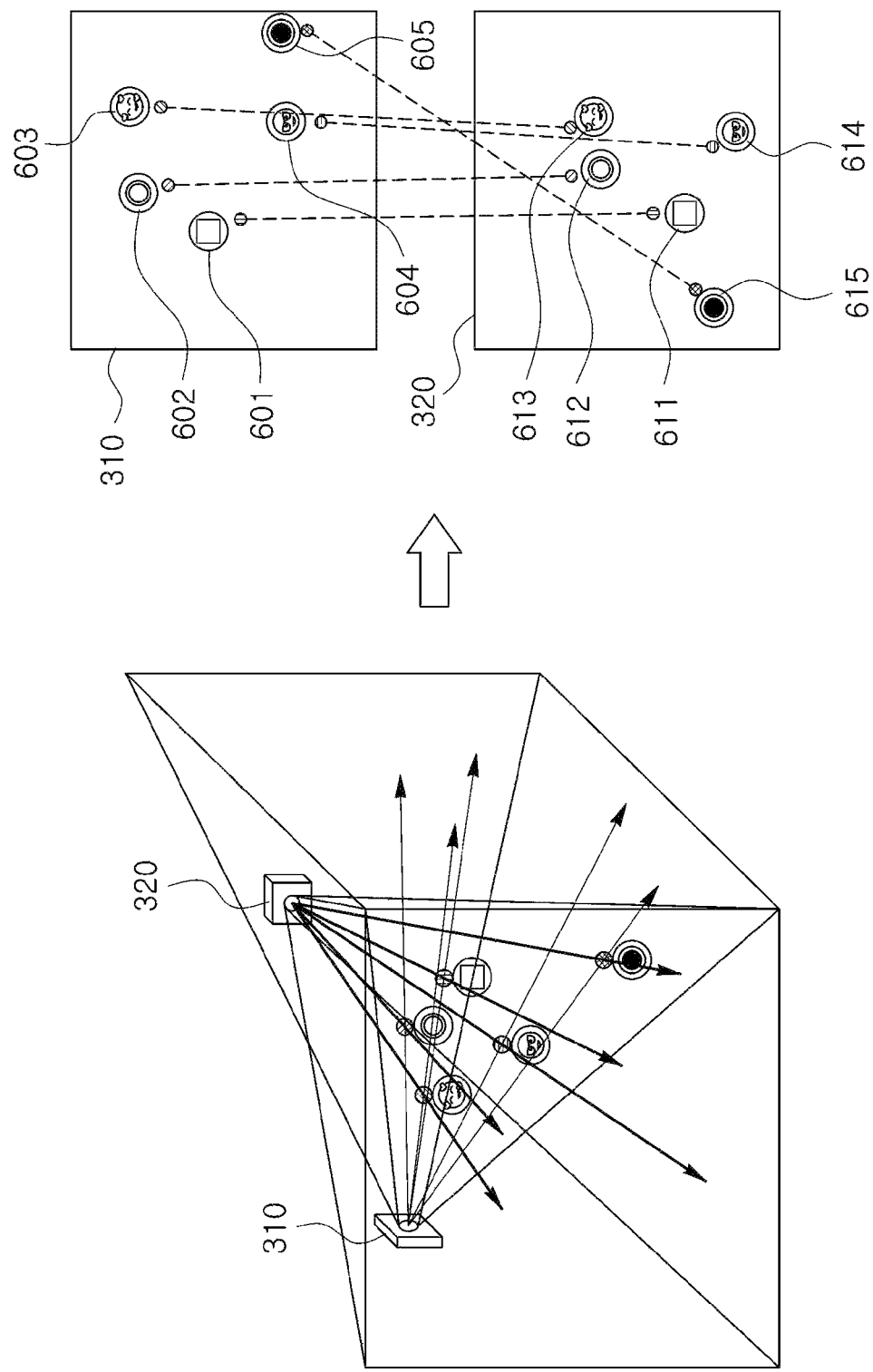
FIG. 6 illustratively shows how to specify a matching relationship between candidate figures according to one embodiment of the invention.

As another example, referring to FIG. 6, the information on in-image coordinate points of a region of interest, which is acquired by the information acquisition unit 210 according to one embodiment of the invention, may include identification information 601, 602, 603, 604, 605, 611, 612, 613, 614, 615 that may be distinguished between the image modules or target regions of interest. The spatial coordinate calculation unit 220 may specify a candidate figure or object 611 whose positional relationship is to be matched with a first candidate figure or object 601 of the first image module 310 (or the second image module 320) among at least one candidate figure or object 611, 612, 613, 614, 615 of the second image module 320 (or the first image module 310) with reference to the identification information 601, 602, 603, 604, 605, 611, 612, 613, 614, 615. Further, the identification information according to one embodiment of the invention may include information on at least one of a shape, color, temperature, pattern, and marker (e.g., emoji, QR code, etc.) specified in the images of the region of interest.

As yet another example, according to one embodiment of the invention, when candidate figures of the first image module 310 and the second image module 320 do not match one-to-one (e.g., when the number of candidate figures of the first image module 310 is different from the number of candidate figures of the second image module 320, or when there is a many-to-many relationship), the spatial coordinate calculation unit 220 may specify a candidate figure whose positional relationship is to be matched with a first candidate figure of the first image module 310 (or the second image module 320) among at least one candidate figure of the second image module 320 (or the first image module 310) by specifying candidate figures that may be grouped among the candidate figures of the first image module 310 and the second image module 320.

Figure 7:
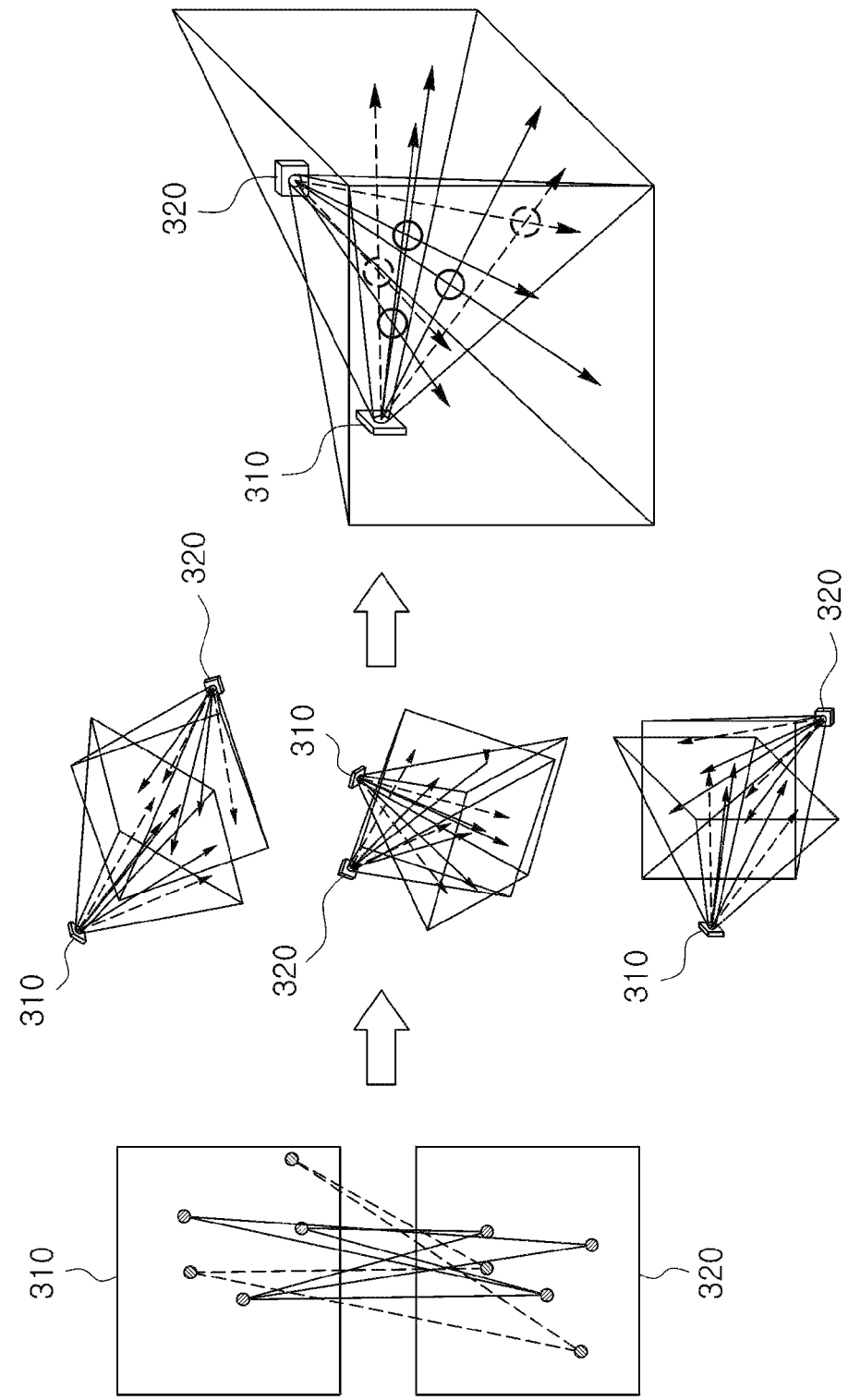
FIG. 7 illustratively shows how to specify a matching relationship between candidate figures according to one embodiment of the invention.
Figure 8:
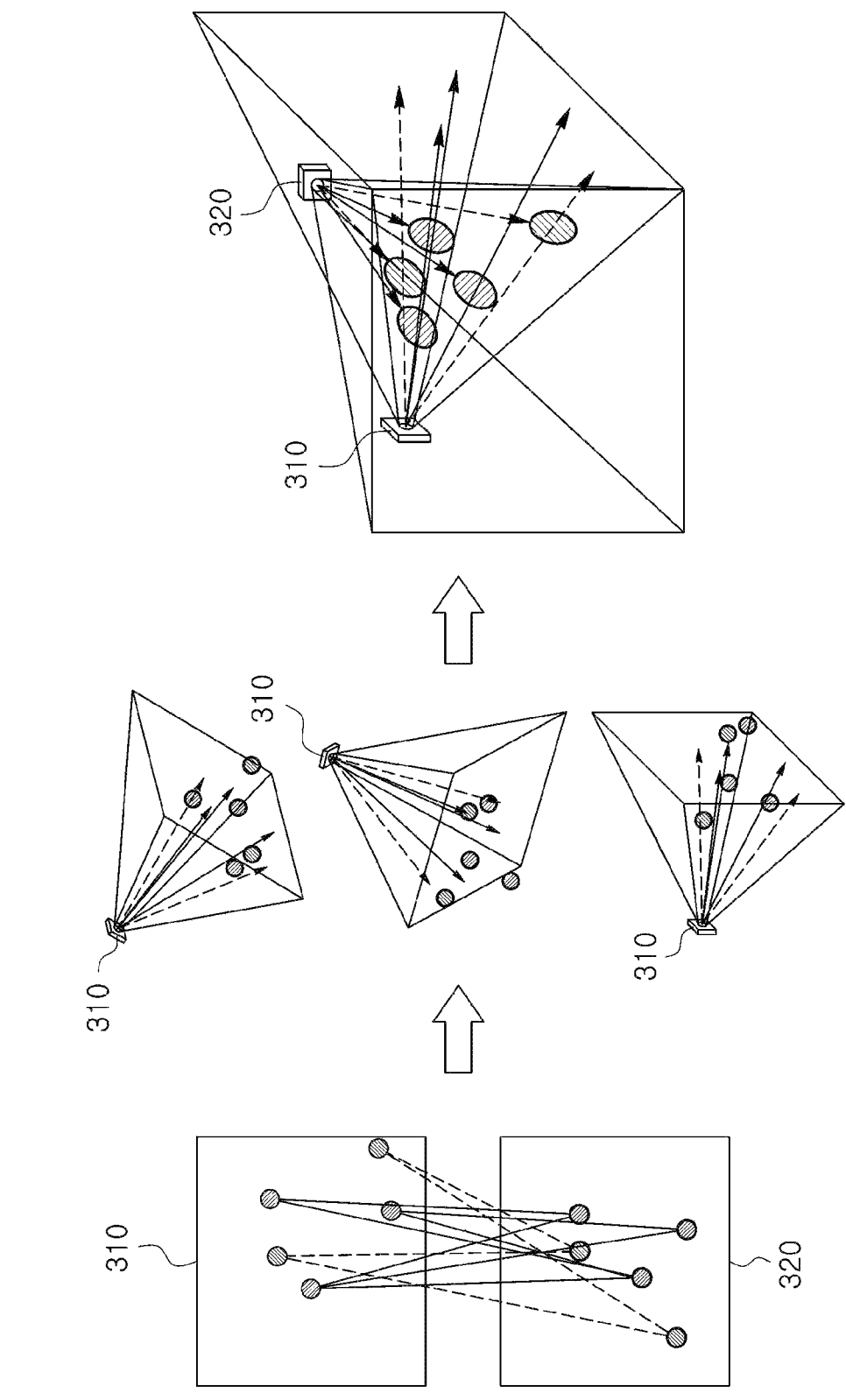
FIG. 8 illustratively shows how to specify a matching relationship between candidate figures according to one embodiment of the invention.
Figure 9:
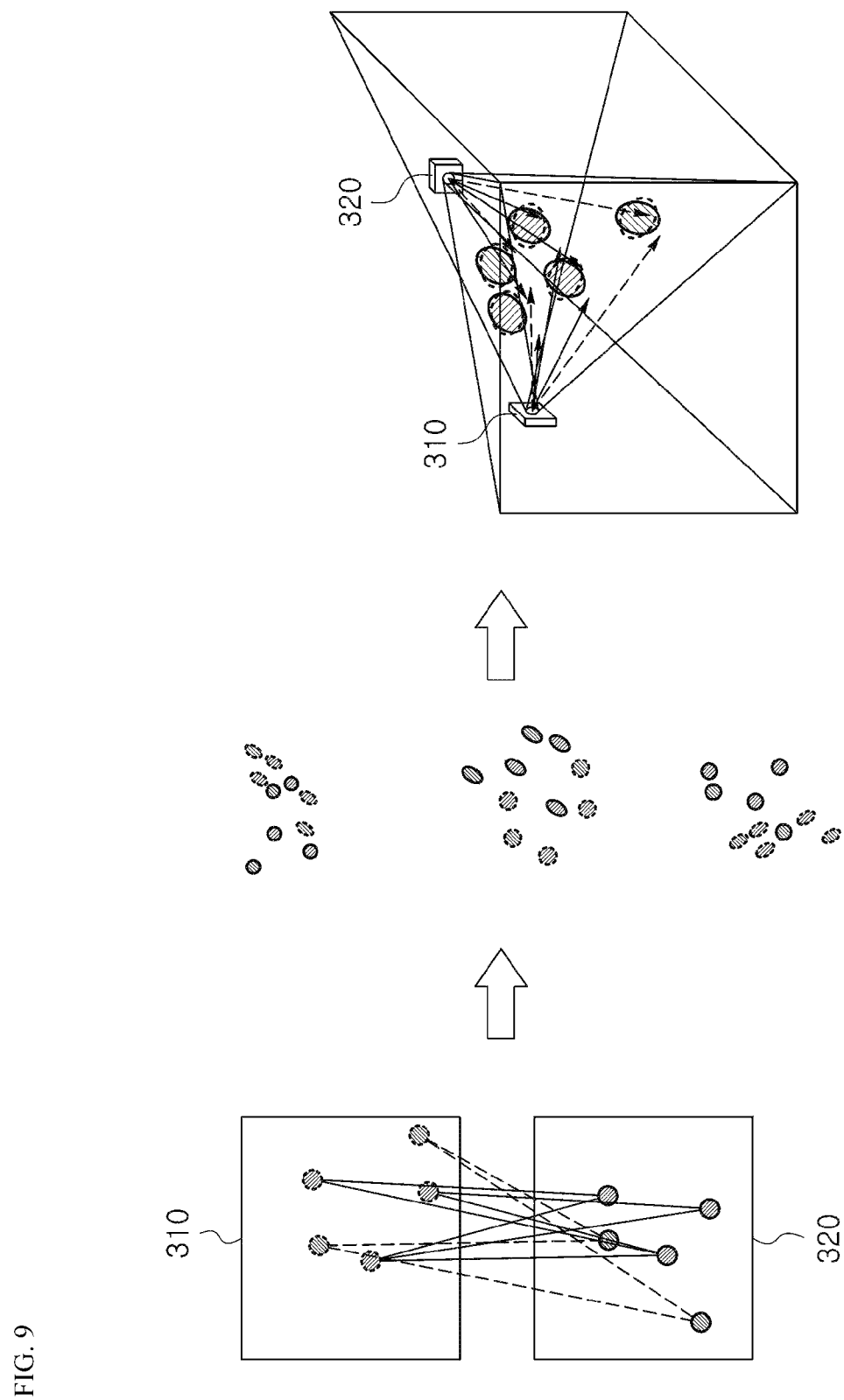
FIG. 9 illustratively shows how to specify a matching relationship between candidate figures according to one embodiment of the invention.

For example, referring to FIGS. 7 to 9, when a matching relationship between candidate figures of the first image module 310 and the second image module 320 (vectors or spatial figures in this case) is not a one-to-one relationship, the spatial coordinate calculation unit 220 according to one embodiment of the invention may group and match vectors or spatial figures within a predetermined distance from the vectors or spatial figures that do not match one-to-one.

Further, the spatial coordinate calculation unit 220 according to one embodiment of the invention may specify information on a positional relationship of the plurality of image modules 300 with reference to coordinate points corresponding to at least three target regions of interest. According to one embodiment of the invention, the information on the positional relationship may include information on angles formed between the plurality of image modules 300, angles at which the plurality of image modules 300 are inclined in the reference space, and photographing directions of the plurality of image modules 300.

Specifically, when information on in-image coordinate points of at least three target regions of interest is acquired from each of the plurality of image modules 300, the spatial coordinate calculation unit 220 according to one embodiment of the invention may specify the information on the positional relationship of the plurality of image modules 300 with reference to at least three points (or regions) of intersection between candidate figures of the target regions of interest corresponding to the plurality of image modules 300.

Figure 10:
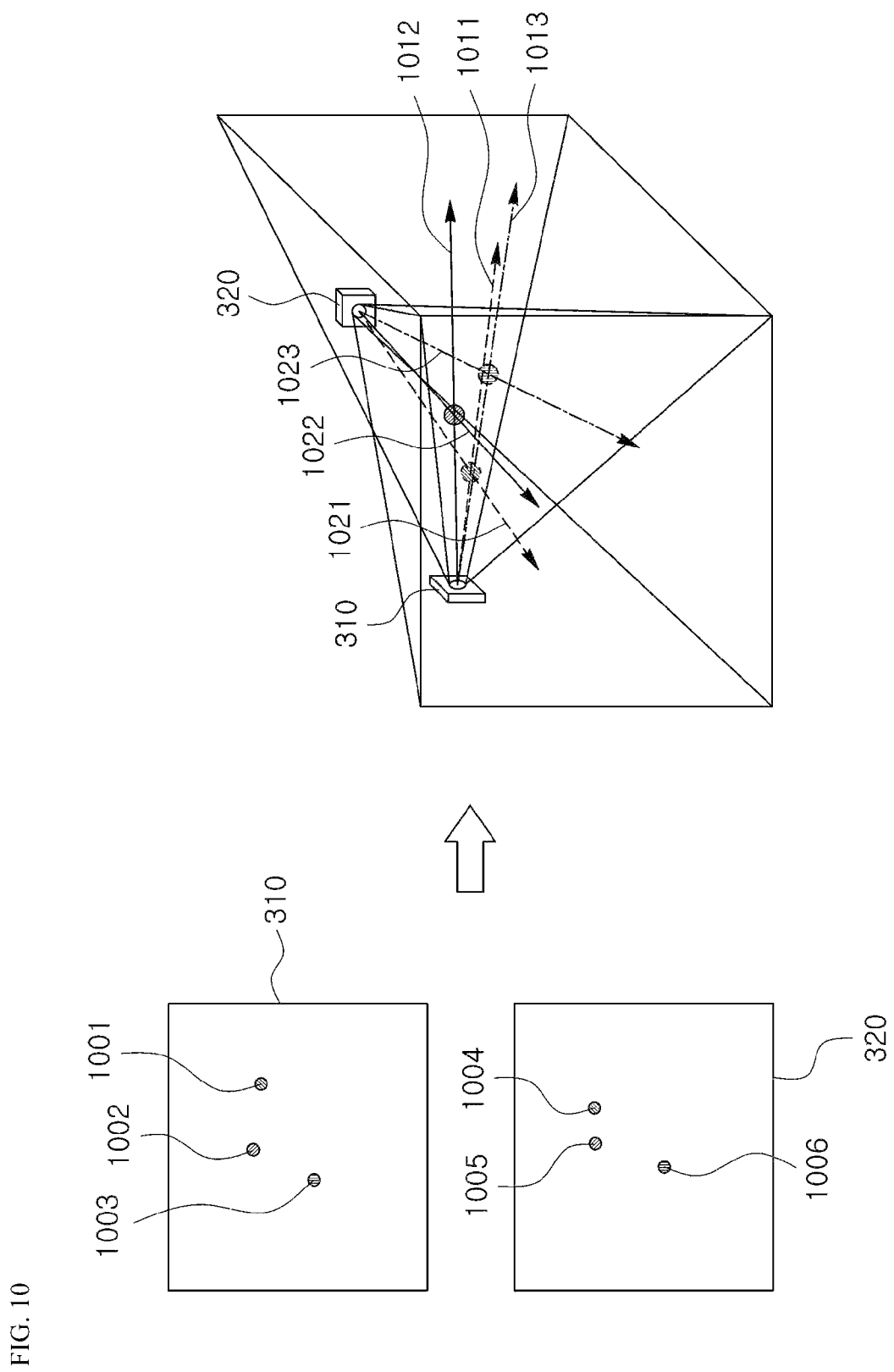
FIG. 10 illustratively shows how to specify a positional relationship between a plurality of image modules according to one embodiment of the invention.

For example, referring to FIG. 10, according to one embodiment of the invention, when in-image coordinate points of three target regions of interest are first to third coordinate points 1001, 1002, 1003 and fourth to sixth coordinate points 1004, 1005, 1006 in the first image module 310 and the second image module 320 (which are two-dimensional image modules), respectively, three points in the reference space may be specified where a first vector 1011, a second vector 1012, and a third vector 1013 of the target regions of interest corresponding to the first image module 310 intersect a fourth vector 1021, a fifth vector 1022, and a sixth vector 1023 of the target regions of interest corresponding to the second image module 320, so that the positional relationship between the first image module 310 and the second image module 320 may be specified on the basis of the three points.

As another example, according to one embodiment of the invention, when in-image coordinate points of three target regions of interest are seventh to ninth coordinate points and tenth to twelfth coordinate points in the first image module 310 and the second image module 320 (which are three-dimensional image modules), respectively, three regions in the reference space may be specified where a first spatial figure, a second spatial figure, and a third spatial figure of the target regions of interest corresponding to the first image module 310 intersect a fourth spatial figure, a fifth spatial figure, and a sixth spatial figure of the target regions of interest corresponding to the second image module 320, so that the positional relationship between the first image module 310 and the second image module 320 may be specified on the basis of the three regions.

As yet another example, according to one embodiment of the invention, when in-image coordinate points of three target regions of interest are thirteenth to fifteenth coordinate points and sixteenth to eighteenth coordinate points in the first image module 310 and the second image module 320 (which are two-dimensional and three-dimensional image modules), respectively, three points in the reference space may be specified where a seventh vector, a eighth vector, and a ninth vector of the target regions of interest corresponding to the first image module 310 intersect a seventh spatial figure, an eighth spatial figure, and a ninth spatial figure of the target regions of interest corresponding to the second image module 320, so that the positional relationship between the first image module 310 and the second image module 320 may be specified on the basis of the three points.

Next, the communication unit 230 according to one embodiment of the invention may function to enable data transmission/reception from/to the information acquisition unit 210 and the spatial coordinate calculation unit 220.

Lastly, the control unit 240 according to one embodiment of the invention may function to control data flow among the information acquisition unit 210, the spatial coordinate calculation unit 220, and the communication unit 230. That is, the control unit 240 according to the invention may control data flow into/out of the position calculation system 200 or data flow among the respective components of the position calculation system 200, such that the information acquisition unit 210, the spatial coordinate calculation unit 220, and the communication unit 230 may carry out their particular functions, respectively.

Figure 11:
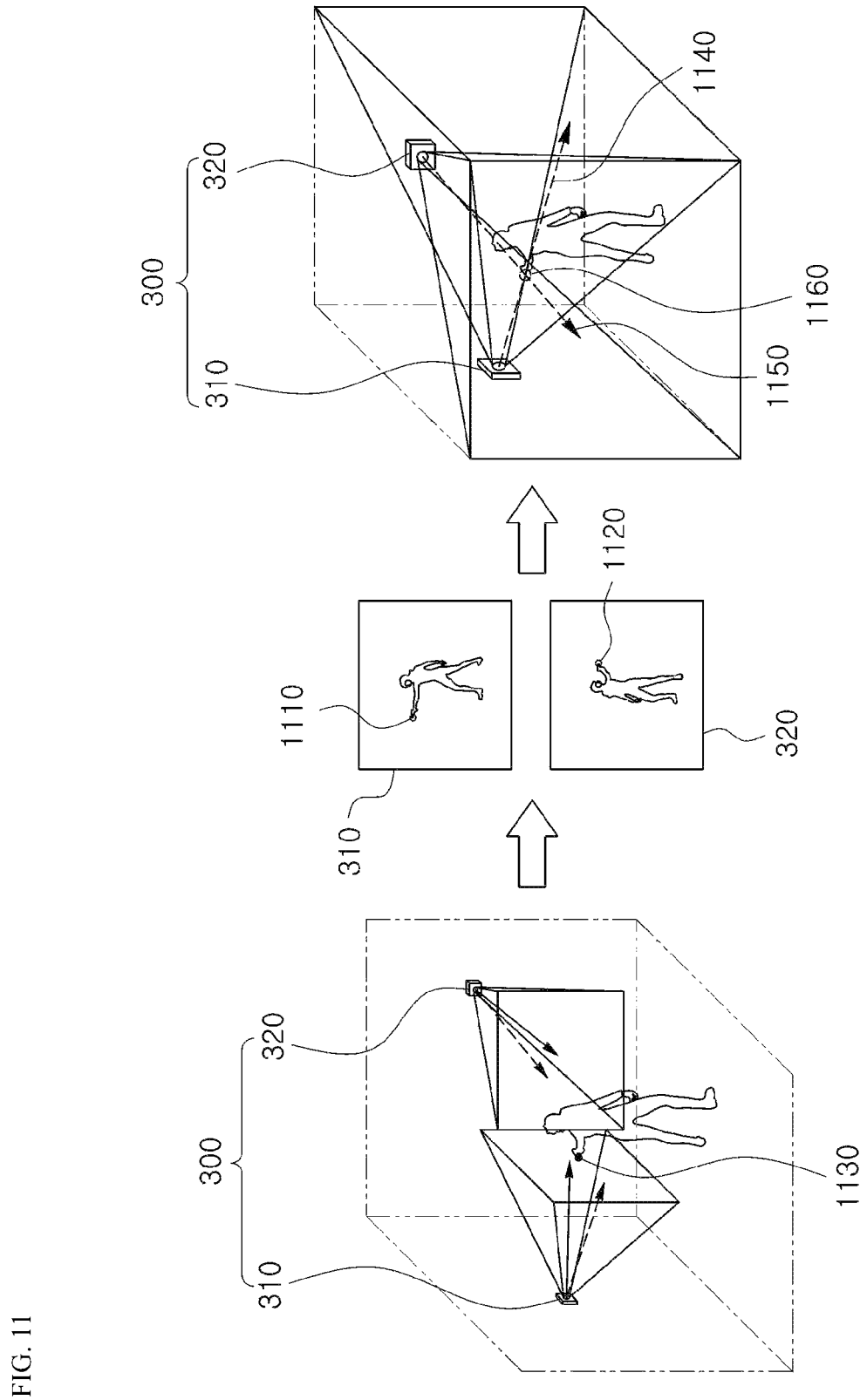
FIG. 11 illustratively shows how to calculate a spatial coordinate point of a region of interest by a position calculation system according to one embodiment of the invention.

FIG. 11 illustratively shows how to calculate a spatial coordinate point of a region of interest by the position calculation system 200 according to one embodiment of the invention.

According to one embodiment of the invention, it may be assumed that the spatial coordinate point of the region of interest is calculated by the first image module 310 and the second image module 320, which are two-dimensional image modules. Further, in this case, the region of interest according to one embodiment of the invention may be a point 1130 of a user's finger gun.

First, according to one embodiment of the invention, information on in-image coordinate points 1110 and 1120 of a region of interest 1130 contained in a plurality of images respectively photographed by the first image module 310 and the second image module 320 may be acquired. That is, according to one embodiment of the invention, the position calculation system 200 does not acquire the images photographed by the first image module 310 and the second image module 320, but acquire the information on the in-image coordinate points of the region of interest contained in these images.

Next, according to one embodiment of the invention, vectors 1140 and 1150 containing a position where the target region of interest 1130 is located in the reference space may be specified on the basis of information on positions where the first image module 310 and the second image module 320 are installed and the information on the in-image coordinate points 1110 and 1120 of the target region of interest 1130 contained in the images photographed by the first image module 310 and the second image module 320. That is, according to one embodiment of the invention, a first vector 1140 of the target region of interest 1130 corresponding to the first image module 310 in the reference space and a second vector 1150 of the target region of interest 1130 corresponding to the second image module 320 in the reference space may be specified, respectively.

Next, according to one embodiment of the invention, a point of intersection 1160 between the first vector 1140 and the second vector 1150 may be specified as the position where the target region of interest 1130 is located in the reference space.

Next, according to one embodiment of the invention, the position calculation system 200 may calculate a coordinate point 1160 corresponding to the specified position in the reference space as a spatial coordinate point of the region of interest 1130 according to the invention.

Figure 12:
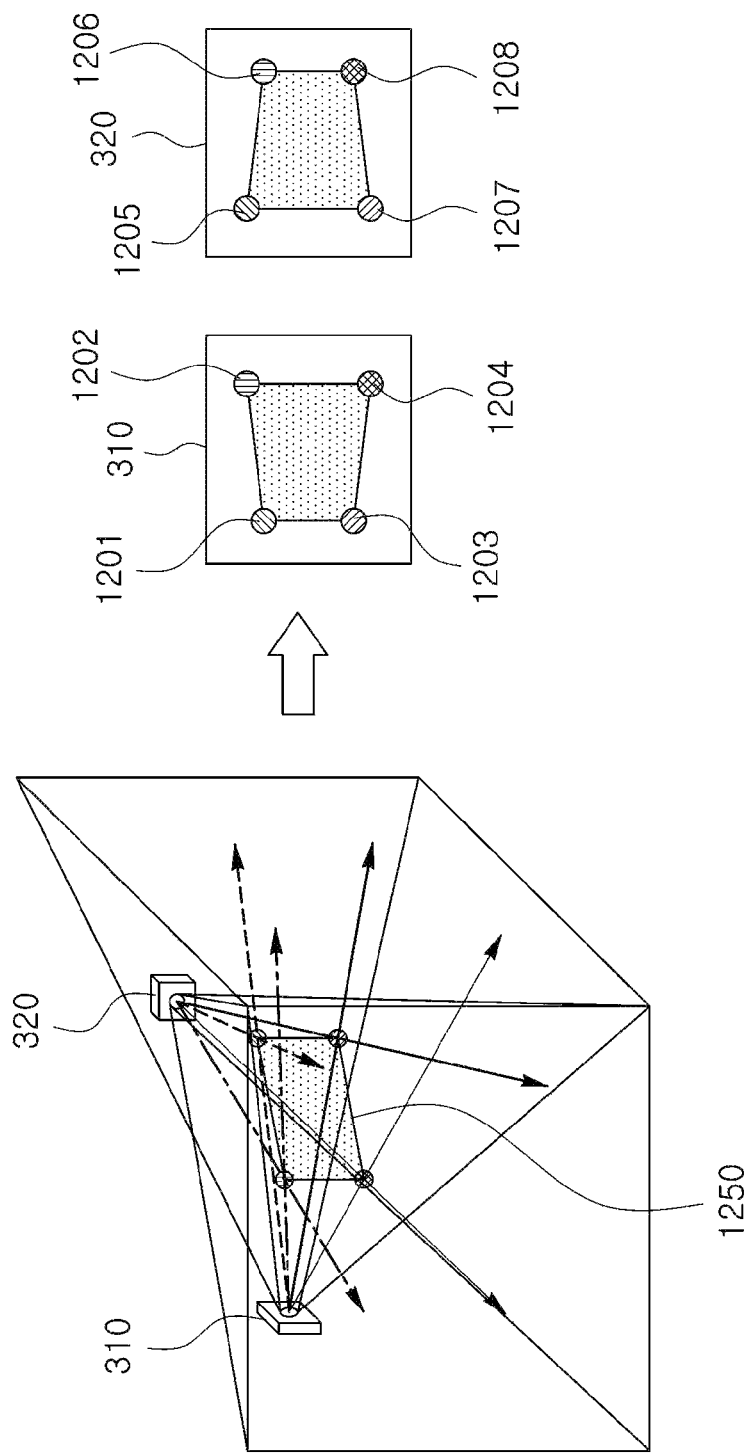
FIG. 12 illustratively shows how to specify positions of a plurality of image modules using information on physical values of an object according to one embodiment of the invention.

FIG. 12 illustratively shows how to specify positions of the plurality of image modules 300 using information on physical values of an object according to one embodiment of the invention.

The position calculation system 200 according to one embodiment of the invention may specify coordinate points of positions where the plurality of image modules 300 are installed in the reference space, with reference to information on physical values of an object in the real world (e.g., a length, size, area, and volume of the object).

For example, referring to FIG. 12, when an object 1250 is in the shape of a tetragon, the position calculation system 200 according to one embodiment of the invention may specify coordinate points of positions where the first image module 310 and the second image module 320 are installed in the reference space, by determining each corner point of the object 1250 as a target region of interest to acquire information on in-image coordinate points 1201, 1202, 1203, 1204, 1205, 1206, 1207, and 1208 of the target regions of interest, and comparing and analyzing the acquired information on the coordinate points 1201, 1202, 1203, 1204, 1205, 1206, 1207, and 1208 and information on physical values (e.g., a width, depth, height, and angle) of the object 1250 in the real world. Meanwhile, according to one embodiment of the invention, the position calculation system 200 may specify the coordinate points of the positions where the first image module 310 and the second image module 320 are installed in the reference space, with further reference to information on a coordinate point of each corner point of the object 1250 in the reference space.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as readonly memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for calculating a spatial coordinate point of a region of interest, the method comprising the steps of:
acquiring information on an in-image coordinate point of a region of interest contained in each of a plurality of images respectively photographed by a plurality of image modules;
specifying a candidate figure in a reference space, with reference to information on a position where at least one of the plurality of image modules is installed and information on an in-image coordinate point of a target region of interest contained in an image photographed by the at least one image module, the candidate figure containing a position where the target region of interest is located in the reference space; and
specifying the position where the target region of interest is located in the reference space, with reference to a positional relationship between a first candidate figure of the target region of interest corresponding to a first image module and a second candidate figure of the target region of interest corresponding to a second image module,
wherein the step of specifying the position where the target region of interest is located in the reference space comprises the steps of:
determining whether the first and second candidate figures intersect each other;
in response to determining that the first and second candidate figures intersect each other, specifying the position where the target region of interest is located in the reference space, on the basis of a point or region of intersection between the first and second candidate figures; and
in response to determining that the first and second candidate figures do not intersect each other, specifying the position where the target region of interest is located in the reference space, on the basis of a line connecting the first and second candidate figures, and
wherein areas or volumes of the first and second candidate figures are adaptively determined according to resolutions of the first and second image modules.

2. The method of claim 1, wherein in the step of specifying the candidate figure, the candidate figure is specified with further reference to properties of the at least one image module.

3. The method of claim 1, wherein the first and second candidate figures are specified as vectors when the first image module and the second image module are two-dimensional image modules.

4. The method of claim 1, wherein the first and second candidate figures are specified as spatial figures when the first image module and the second image module are three-dimensional image modules.

5. The method of claim 1, wherein the first and second candidate figures are specified as a spatial figure and a vector when the first image module and the second image module are a three-dimensional image module and a two-dimensional image module, respectively.

6. The method of claim 1, wherein information on a positional relationship between the plurality of imaging modules is specified with reference to information on in-image coordinate points of at least three target regions of interest.

7. The method of claim 1, wherein the first candidate figure of the first image module and the second candidate figure of the second image module are matched with each other on the basis of each frame synchronized between the first image module and the second image module.

8. The method of claim 1, wherein the information on the in-image coordinate point of the target region of interest includes identification information distinguishable between a plurality of target regions of interest, and the first candidate figure of the first image module and the second candidate figure of the second image module are matched with each other on the basis of the identification information.

9. The method of claim 1, wherein when the first candidate figure of the first image module and the second candidate figure of the second image module do not match one-to-one, candidate figures capable of being grouped among the first candidate figure of the first image module and the second candidate figure of the second image module are specified and matched with each other.

10. A non-transitory computer-readable recording medium having stored thereon a computer program for executing the method of claim 1.

11. The method of claim 3, wherein the position where the target region of interest is located is specified as a point of intersection between a first vector of the target region of interest corresponding to the first image module and a second vector of the target region of interest corresponding to the second image module.

12. The method of claim 4, wherein the position where the target region of interest is located is specified as a region of intersection between a first spatial figure of the target region of interest corresponding to the first image module and a second spatial figure of the target region of interest corresponding to the second image module.

13. The method of claim 5, wherein the position where the target region of interest is located is specified as a point of intersection between a spatial figure of the target region of interest corresponding to the first image module and a vector of the target region of interest corresponding to the second image module.

14. A system for calculating a spatial coordinate point of a region of interest, the system comprising:
an information acquisition unit configured to acquire information on an in-image coordinate point of a region of interest contained in each of a plurality of images respectively photographed by a plurality of image modules; and
a spatial coordinate calculation unit configured to specify a candidate figure in a reference space, with reference to information on a position where at least one of the plurality of image modules is installed and information on an in-image coordinate point of a target region of interest contained in an image photographed by the at least one image module, the candidate figure containing a position where the target region of interest is located in the reference space, and to specify the position where the target region of interest is located in the reference space, with reference to a positional relationship between a first candidate figure of the target region of interest corresponding to a first image module and a second candidate figure of the target region of interest corresponding to a second image module, wherein the spatial coordinate calculation unit is configured to:

determine whether the first and second candidate figures intersect each other;

in response to determining that the first and second candidate figures intersect each other, specify the position where the target region of interest is located in the reference space, on the basis of a point or region of intersection between the first and second candidate figures; and in response to determining that the first and second candidate figures do not intersect each other, specify the position where the target region of interest is located in the reference space, on the basis of a line connecting the first and second candidate figures, and wherein areas or volumes of the first and second candidate figures are adaptively determined according to resolutions of the first and second image modules.

* * * * *